United States Patent
Stevens et al.

(10) Patent No.: US 9,874,664 B2
(45) Date of Patent: Jan. 23, 2018

(54) ACTUATION OF FLUID-FILLED LENSES

(71) Applicant: Adlens Ltd., Oxford (GB)

(72) Inventors: Robert Edward Stevens, Oxford (GB); Alex Edginton, Oxford (GB); Julian Brandon-Jones, London (GB); Roger Brian Minchin Clarke, Oxford (GB)

(73) Assignee: Adlens Ltd., Eynsham (GB)

( * ) Notice: Subject to any disclaimer, the term of this patent is extended or adjusted under 35 U.S.C. 154(b) by 112 days.

(21) Appl. No.: 14/764,726

(22) PCT Filed: Jan. 30, 2014

(86) PCT No.: PCT/GB2014/050252
§ 371 (c)(1),
(2) Date: Jul. 30, 2015

(87) PCT Pub. No.: WO2014/118546
PCT Pub. Date: Aug. 7, 2014

(65) Prior Publication Data
US 2015/0378067 A1    Dec. 31, 2015

(30) Foreign Application Priority Data
Jan. 31, 2013 (GB) .................................. 1301764.5

(51) Int. Cl.
*G02B 3/14* (2006.01)
*G02C 7/08* (2006.01)
(Continued)

(52) U.S. Cl.
CPC ............... *G02B 3/14* (2013.01); *G02B 15/00* (2013.01); *G02C 7/083* (2013.01); *G02C 7/085* (2013.01); *G02C 11/10* (2013.01)

(58) Field of Classification Search
CPC ........ G02B 3/14; G02B 15/00; G02B 26/004; G02C 11/10; G02C 7/083; G02C 7/085
See application file for complete search history.

(56) References Cited

U.S. PATENT DOCUMENTS 3,598,479 A * 8/1971 Wright .................. G02C 7/085
351/159.04
6,318,857 B1  11/2001 Shirayanagi
(Continued)

FOREIGN PATENT DOCUMENTS

| CN | 201152911 Y | 11/2008 |
|---|---|---|
| CN | 101685141 A | 3/2010 |

(Continued)

*Primary Examiner* — Joseph P Martinez
(74) *Attorney, Agent, or Firm* — Mintz Levin Cohn Ferris Glovsky and Popeo, P.C.

(57) ABSTRACT

An actuation mechanism for simultaneous actuation of first and second variable focal length lenses is disclosed. Each lens comprises a distensible membrane bounding a fluid-filled cavity, the focal length varying with the degree of curvature of the membrane as it distends. The actuation mechanism comprises a hydraulic master actuator in fluid communication with a hydraulic slave actuator associated with the first lens and with a hydraulic slave actuator associated with the second lens. Each slave actuator is configured to vary the degree of distension of the membrane of its associated lens in response to operation of the master actuator, whereby the master actuator is operable to cause a variation of the degree of distension of the membranes of both the first and second lenses simultaneously.

14 Claims, 5 Drawing Sheets

(51) Int. Cl.
*G02B 15/00* (2006.01)
*G02C 11/00* (2006.01)

(56) References Cited

U.S. PATENT DOCUMENTS

| | | |
|---|---|---|
| 7,359,124 B1 | 4/2008 | Fang et al. |
| 7,986,465 B1 * | 7/2011 | Lo .......................... G02B 3/14 |
| | | 359/665 |
| 2005/0270664 A1 | 12/2005 | Pauker et al. |
| 2010/0182703 A1 | 7/2010 | Bolis |

FOREIGN PATENT DOCUMENTS

| | | |
|---|---|---|
| EP | 1600100 A1 | 11/2005 |
| EP | 2149800 A1 | 2/2010 |
| GB | 1209234 A | 10/1970 |
| WO | WO-0106302 A1 | 1/2001 |
| WO | WO-2006055366 A1 | 5/2006 |
| WO | 2007/103944 A2 | 9/2007 |
| WO | WO-2008090986 A1 | 7/2008 |
| WO | 2009010559 A1 | 1/2009 |
| WO | WO-2013144533 A1 | 10/2013 |

\* cited by examiner

ACTUATION OF FLUID-FILLED LENSES

RELATED APPLICATIONS

This application is a national stage application, filed under 35 U.S.C. §371, of International Application No. PCT/GB2014/050252, filed on Jan. 30, 2014, which claims the benefit of, and priority to, U.K. Provisional Application No. 1301764.5, filed Jan. 31, 2013. The contents of each of these applications are expressly incorporated herein by reference in their entireties.

This invention relates to an actuation mechanism for variable focal length lenses comprising distensible membranes bounding a fluid-filled cavity. In this type of lens, the focal length varies with the curvature of the membrane as it distends.

These fluid-filled lenses have a variety of uses. One such use is in spectacles where the fluid-filled lenses can be used to deal with presbyopia. This is a condition that begins to affect people at the onset of middle age in which the eye exhibits a diminished ability to focus on near objects. The condition is progressive and results in many people requiring vision correction to facilitate reading. It is often compounded by myopia or other vision defects, requiring different prescriptions for different viewing distances. For example, a myopic individual may require a spherical power of minus 5 dioptres with an additional plus 2 dioptres to cater for close tasks such as reading. The additional plus 2 dioptres compensates for the eye's inability to focus for reading. Fluid-filled lenses can be used to deal with presbyopia by allowing the user to increase the degree of distension of the membranes when they are concentrating on close tasks. The fluid-filled lens may be used in conjunction with a rigid lens for correcting other defects such as myopia and may be distended only to provide the additional optical power as required.

There is a variety of ways in which the distension of the membranes in these lenses can be controlled. For example, in a first variant the volume of a reservoir in fluid communication with a lens can be adjusted. As the volume of the reservoir shrinks, the excess fluid is forced into the lens, causing the membrane to distend. Similarly, if the volume of the reservoir is enlarged again, the surface tension in the membrane forces the fluid back into the reservoir and the membrane returns to its original shape. Each lens has a dedicated reservoir.

In a second variant, the lens is sealed with a fixed volume of fluid occupying a cavity bounded by the membrane. The size of the cavity can be varied by applying an actuation force, typically at strategic points around the periphery of the lens. Since the volume of fluid is fixed, the membrane has to distend to accommodate it and the optical power of the lens changes. Allowing the lens to relax by removing the actuation force causes the cavity to resume its original size and the membrane returns to its original shape.

Generally, it is desirable to adjust the optical power of both lenses together because it is disconcerting to a wearer of spectacles if the lenses are adjusted separately as it results in blurred vision in one eye only. It is however difficult to arrange for both lenses to be adjusted together without detracting from the aesthetic appeal of a spectacle frame bearing such lenses. There is simply no space to accommodate a control system that can actuate the two reservoirs of the first variant together.

Attempts have been made to provide a mechanical linkage in the bridge of a spectacle frame that can apply the actuation force to both lenses in the second variant. However, this results in a bulky and unattractive bridge. Examples of this type of actuation system are disclosed in WO2001/006302 and WO2006/055366.

There are other possible applications where it would be desirable to provide simultaneous adjustment of the focal lengths of multiple lenses without increasing the bulk of the optical system to accommodate the adjustment mechanism. For example, this is a typical requirement of high optical quality zoom lenses, for which the compactness requirements are ever increasing due to the burgeoning demand for compact cameras and integrated cameras in devices such as mobile phones.

In accordance with a first aspect of the invention, there is provided an actuation mechanism for simultaneous actuation of first and second variable focal length lenses, each comprising a distensible membrane bounding a fluid-filled cavity, the focal length varying with the degree of curvature of the membrane as it distends, the actuation mechanism comprising a hydraulic master actuator in fluid communication with a hydraulic slave actuator associated with the first lens and with a hydraulic slave actuator associated with the second lens, each slave actuator being configured to vary the degree of distension of the membrane of its associated lens in response to operation of the master actuator, whereby the master actuator is operable to cause a variation of the degree of distension of the membranes of both the first and second lenses simultaneously.

The invention provides a slave actuator for each of the first and second lenses. Each of the slave actuators is driven by the master actuator so that operation of the master actuator results in each of the slave actuators being driven together. The distension of the membranes is therefore controlled simultaneously, and the use of hydraulic coupling between the master and slave actuators allows the actuation force for the two lenses to be transmitted very straightforwardly and without requiring excessive space. Hydraulic channels of very small diameter can be used and their path can be quite serpentine in nature, which allows hydraulic coupling between the master and slave actuators to be installed in compact optical systems. For example, the hydraulic coupling can be installed in a pair of spectacles such that the size of the bridge and other parts of the frame do not need to be increased significantly to accommodate the hydraulic channels.

Each slave actuator is typically adapted to exert a respective desired force for a given fluid pressure.

The hydraulic master actuator may be coupled to the slave actuators by transparent tubing, the transparent tubing being matched in refractive index to the fluid filling the cavities of the first and second lenses.

This results in the hydraulic tubing being rendered invisible when it is immersed in the fluid filling the cavities. The tubing may therefore be run internally within the lenses without causing an optical obstruction, or indeed without being noticeable at all. This reduces the space occupied by the lenses as the hydraulic tubing need not be run around the edge of the lenses and could facilitate the production of rimless spectacles, for example, using this type of lens.

The fluid in the hydraulic tubing will preferably be matched to the refractive index of the hydraulic tubing and the fluid filling the cavities of the first and second lenses. This maximises the effect of rendering the tubing invisible. The fluid in the hydraulic tubing will typically be the same as the fluid filling the cavities of the first and second lenses to achieve this.

Straightforward plastic tubing of appropriate size can be used to provide the hydraulic coupling between the master and slave actuators. Alternatively, hollow channels can be formed integrally into appropriate parts of a structure housing the first and second lenses (for example, a pair of spectacles). For example, the bridge in a pair of spectacles may form at least part of a channel coupling the master actuator to one of the slave actuators.

Each hydraulic slave actuator may be configured to vary the degree of distension of the membrane of its associated lens in response to operation of the master actuator by applying a force on a bending control ring fixed to the periphery of the membrane. This means that the point of application of force is on the bending control ring itself, either directly, via an intervening member of layer of material or via a respective linkage between each actuator and the bending control ring. The bending stiffness of the bending control ring varies at different points of the bending control ring to cause the membrane to adopt a desired (e.g. spherical) surface profile when an actuation force is applied to selected actuation points.

Each hydraulic slave actuator is disposed outside the fluid-filled cavity of its associated lens. This makes it easier to seal the fluid-filled cavity because there is no need for the hydraulic control arrangements to penetrate it.

Each hydraulic slave actuator may be adapted to apply an actuation force to at least one actuation point on its associated lens. Alternatively, each slave actuator may be adapted to apply an actuation force to at least two actuation points on its associated lens. The or each actuation point may be on the bending control ring mentioned above.

The first and second lenses may form part of a plurality of three or more variable focal length lenses, each lens in the plurality comprising a distensible membrane bounding a fluid-filled cavity, the focal length varying with the degree of curvature of the membrane as it distends, the actuation mechanism comprising a hydraulic master actuator in fluid communication with a plurality of hydraulic slave actuators, each of which is associated with a respective lens, each slave actuator being configured to vary the degree of distension of the membrane of its associated lens in response to operation of the master actuator, whereby the master actuator is operable to cause a variation of the degree of distension of the membranes of all lenses simultaneously.

This can be used in situations where it is required to adjust the focal length of more than two lenses simultaneously. One possible application of this is in lenses used to focus the diffuse light from the arrays of light emitting diodes (LEDs) that are used in many modern luminaires.

In accordance with a second aspect of the invention, there is provided an actuation mechanism for a first variable focal length lens comprising a distensible membrane bounding a fluid-filled cavity, the focal length varying with the curvature of the membrane as it distends, the actuation mechanism comprising a hydraulic master actuator in fluid communication with a first plurality of hydraulic slave actuators, which are configured together to vary the degree of distension of the membrane of the first lens in response to operation of the master actuator.

The invention therefore provides a simple way of coupling the force from a master actuator to multiple points around a lens of the second variant, thereby enabling good control of the distension of the lens.

Each of the first plurality of hydraulic slave actuators is typically disposed at a respective control point around the periphery of the first lens.

This is useful with lenses of the second variant in which the volume of the cavity is shrunk so that the membrane is caused to distend. As explained in our co-pending application, PCT/GB2012/051426, it is possible to design this type of lens to have a non-circular shape but so that the membrane adopts a spherical surface profile when distended. This is achieved by use of a peripheral support, such as a bending control ring, attached to the membrane that has variable bending stiffness to cause the membrane to adopt the spherical surface profile when an actuation force is applied to strategically chosen points. The control points mentioned above can therefore be chosen to coincide with these strategically chosen points for application of the actuation force.

Normally, the actuation force required at each of the chosen control points will be different. Therefore, each slave actuator in the first plurality of slave actuators is normally adapted to exert a respective desired force for a given fluid pressure.

This can be achieved in a variety of ways. For example, the cross-sectional area of a piston within each of the slave actuators can be chosen to cause the desired force to be exerted when a given pressure is applied from the master actuator. Alternatively, the master actuator can have multiple pistons itself, each with different cross-sectional areas to produce a different pressure at each slave actuator, which can then have pistons with the same cross-sectional area but still produce different actuation forces. This could be advantageous in manufacturing as it allows the same slave actuator to be used at each control point, although the master actuator is more complicated. Of course, the two approaches may be combined.

In one embodiment, the hydraulic master actuator is coupled to the slave actuators in the first plurality of slave actuators by transparent tubing, the transparent tubing being matched in refractive index to the fluid filling the cavity of the first lens.

The first plurality of hydraulic slave actuators may be configured together to vary the degree of distension of the membrane of the first lens in response to operation of the master actuator by each applying a force on a bending control ring fixed to the periphery of the membrane of the first lens. This means that the points of application of force are on the bending control ring itself, either directly, via an intervening member of layer of material or via respective linkages between each actuator and the bending control ring. The bending stiffness of the bending control ring varies at different points of the bending control ring to cause the membrane to adopt a desired (e.g. spherical) surface profile when an actuation force is applied to selected actuation points.

Each of the first plurality of hydraulic slave actuators may be disposed outside the fluid-filled cavity of the first lens. This makes it easier to seal the fluid-filled cavity because there is no need for the hydraulic control arrangements to penetrate it.

This results in the hydraulic tubing being rendered invisible when it is immersed in the fluid filling the cavity. The tubing may therefore be run internally within the lens without causing an optical obstruction, or indeed without being noticeable at all. This reduces the space occupied by the lens as the hydraulic tubing need not be run around the edge of the lens and could facilitate the production of rimless spectacles, for example, using this type of lens.

The fluid in the hydraulic tubing will preferably be matched to the refractive index of the hydraulic tubing and the fluid filling the cavity of the first variable focus lens. This maximises the effect of rendering the tubing invisible. The fluid in the hydraulic tubing will typically be the same as the fluid filling the cavities of the first variable focus lens to achieve this.

In a preferred embodiment, the actuation mechanism further comprises a second variable focal length lens comprising a distensible membrane bounding a fluid-filled cavity, the focal length varying with the curvature of the membrane as it distends, wherein the hydraulic master actuator is in fluid communication with a second plurality of hydraulic slave actuators, which are configured together to vary the degree of distension of the membrane of the second lens in response to operation of the master actuator.

In this preferred embodiment, the invention provides a plurality of slave actuators for each of the first and second lenses. Each of the slave actuators is driven by the master actuator so that operation of the master actuator results in each of the slave actuators being driven together. The distension of the membranes is therefore controlled simultaneously, and, as with the first aspect, the use of hydraulic coupling between the master and slave actuators allows the actuation force for the two lenses to be transmitted very straightforwardly and without requiring excessive space. This allows the hydraulic coupling to be installed in compact optical systems, such as a pair of spectacles just as in the first aspect.

Straightforward plastic tubing of appropriate size can be used to provide the hydraulic coupling between the master and slave actuators. Alternatively, hollow channels can be formed integrally into appropriate parts of a structure housing the first and second lenses (for example, a pair of spectacles). For example, the bridge in a pair of spectacles may form at least part of a channel coupling the master actuator to one of the slave actuators.

Typically, each of the second plurality of hydraulic slave actuators is disposed at a respective control point around the periphery of the second lens.

This is useful with lenses of the second variant in which the volume of the cavity is shrunk so that the membrane is caused to distend. As explained in our co-pending application, PCT/GB2012/051426, it is possible to design this type of lens to have a non-circular shape but so that the membrane adopts a spherical surface profile when distended. This is achieved by use of a peripheral support attached to the membrane that has variable bending stiffness to cause the membrane to adopt the spherical surface profile when an actuation force is applied to strategically chosen points. The control points mentioned above can therefore be chosen to coincide with these strategically chosen points for application of the actuation force.

Normally, each slave actuator in the second plurality of slave actuators is adapted to exert a respective desired force for a given fluid pressure since the actuation force required at each of the strategically chosen points will normally be different.

In one embodiment, the hydraulic master actuator is coupled to the slave actuators in the second plurality of slave actuators by transparent tubing, the transparent tubing being matched in refractive index to the fluid filling the cavity of the second lens.

The second plurality of hydraulic slave actuators may be configured together to vary the degree of distension of the membrane of the second lens in response to operation of the master actuator by each applying a force on a bending control ring fixed to the periphery of the membrane of the second lens. This means that the points of application of force are on the bending control ring itself, either directly, via an intervening member of layer of material or via respective linkages between each actuator and the bending control ring. The bending stiffness of the bending control ring varies at different points of the bending control ring to cause the membrane to adopt a desired (e.g. spherical) surface profile when an actuation force is applied to selected actuation points.

Each of the second plurality of hydraulic slave actuators may be disposed outside the fluid-filled cavity of the second lens. This makes it easier to seal the fluid-filled cavity because there is no need for the hydraulic control arrangements to penetrate it.

This results in the hydraulic tubing being rendered invisible when it is immersed in the fluid filling the cavities. The tubing may therefore be run internally within the lenses without causing an optical obstruction, or indeed without being noticeable at all. This reduces the space occupied by the lenses as the hydraulic tubing need not be run around the edge of the lenses and could facilitate the production of rimless spectacles, for example, using this type of lens.

The fluid in the hydraulic tubing will preferably be matched to the refractive index of the hydraulic tubing and the fluid filling the cavities of the first and second lenses. This maximises the effect of rendering the tubing invisible. The fluid in the hydraulic tubing will typically be the same as the fluid filling the cavities of the first and second lenses to achieve this.

The first and second lenses of the preferred embodiment may form part of a plurality of three or more variable focal length lenses, each lens in the plurality comprising a distensible membrane bounding a fluid-filled cavity, the focal length varying with the curvature of the membrane as it distends, the actuation mechanism comprising a hydraulic master actuator in fluid communication with respective pluralities of hydraulic slave actuators, each plurality of hydraulic slave actuators being configured together to vary the degree of distension of the membrane of an associated one of the lenses in response to operation of the master actuator.

This can be used in situations where it is required to adjust the focal length of more than two lenses simultaneously. One possible application of this is in lenses used to focus the diffuse light from the arrays of light emitting diodes (LEDs) that are used in many modern luminaires.

Each of the first plurality of slave actuators must lie on the same contour (i.e. a line running around points of identical distance from the optical centre of the lens along a direction parallel to the optical axis) if the forces applied by the actuators are identical. Alternatively, each of the first plurality of slave actuators can lie on a respective contour, one or more of which may be different from the others, if each is caused to apply a respective force dependent on the contour on which it lies. This can be achieved, for example, by using actuators having pistons with different cross-sectional areas to achieve the respective forces required under the same hydraulic pressures.

Similarly, each of the second plurality of slave actuators must lie on the same contour (i.e. a line running around points of identical distance from the optical centre of the lens along a direction parallel to the optical axis) if the forces applied by the actuators are identical. Alternatively, each of the second plurality of slave actuators can lie on a respective contour, one or more of which may be different from the others, if each is caused to apply a respective force dependent on the contour on which it lies. This can be achieved, for example, by using actuators having pistons with different cross-sectional areas to achieve the respective forces required under the same hydraulic pressures.

In a third aspect of the invention, a pair of spectacles comprises a frame and an actuation mechanism according to the first aspect of the invention or the preferred embodiment of the second aspect of the invention, wherein the first and second lenses are housed in the frame to form left and right lenses of the pair of spectacles.

In one embodiment, the degree of distension of the membrane in the first lens is different to that in the second lens for a given operation of the master actuator. This enables the wearer to make use of a technique known as monovision. In this technique, the focal length of one lens is adjusted to correct the vision of the associated eye for near vision (to facilitate reading), whereas the focal length of the other lens is adjusted to correct the vision of the other eye for distance vision (to facilitate normal vision) or intermediate vision (to facilitate looking at a monitor, for example). People are able to adapt to this relatively quickly so that objects over a wider range of distances can be seen in focus, although it does results in a loss of depth perception.

In a fourth aspect of the invention, a zoom lens comprises a plurality of groups of optical elements including a focus group and a variator group in optical alignment, the zoom lens comprising an actuation mechanism according to the first aspect of the invention or the preferred embodiment of the second aspect of the invention, wherein the first and second lenses form part of the focus and variator groups respectively.

In complex lens designs, such as photographic lenses, the individual optical elements (e.g. discrete lenses) are arranged in groups. The optical elements in a group are typically cemented together and act as a unit. Of course, there may be only a single optical element in a group.

In a typical zoom lens, the focus group moves along the optical axis of the zoom lens in order to focus an image on the desired focal plane, for example a film or digital sensor. The variator group moves along the optical axis to vary the magnification power of the focus group; it is largely responsible for adjusting the focal length of the zoom lens. By causing the first and second lenses to move together, it is possible to construct a zoom lens with very little, if any, extra volume requirement that does not require any movement of the focus and variator groups along the optical axis. Often the required variation in focal length of the focus and variator groups to achieve a desired change in focal length of the zoom lens is not the same, but this is easily accommodated by using different actuation forces at the slave actuators when an actuation system according to the first or second aspects of the invention is used.

Typically, the focus and variator groups are required to move in opposite directions along the optical axis. In other words, the change in focal length of each group must typically be in opposite directions. Thus, when an actuation mechanism according to the preferred embodiment of the second aspect of the invention or according to the first aspect of the invention is used, the zoom lens may further comprise a hydraulic inverter to cause opposing variations in the focal lengths of the first and second lenses. The hydraulic inverter can be placed between the master actuator and the slave actuator associated with either the first lens or the second lens. The selected placement will depend on the lens design.

Embodiments of the invention will now be described with reference to the accompanying drawings, in which.

Figure 1:
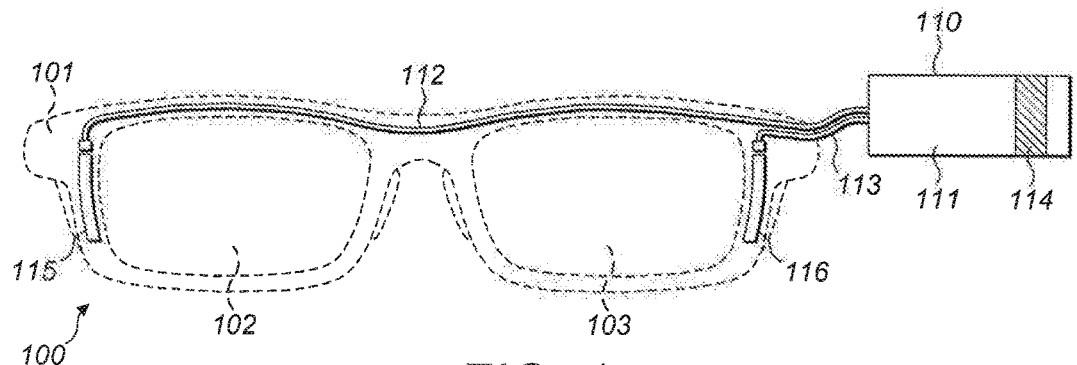
FIG. 1 shows a first embodiment of the invention in which the two lenses are driven by the same hydraulic actuator.
Figure 2:
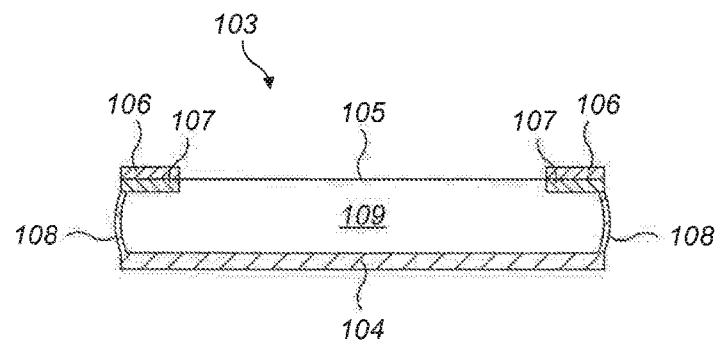
FIG. 2 shows a cross-section through one of the lenses of FIG. 1 when the hydraulic actuator is in a first position.
Figure 3:
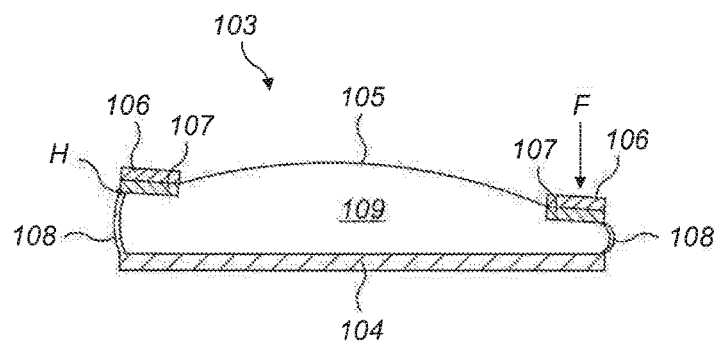
FIG. 3 shows a cross-section through one of the lenses of FIG. 1 when the hydraulic actuator is in a second position.

FIGS. 1 to 3 relate to a first embodiment, employing a different actuation mechanism. In this embodiment, there is no fluid communication between the lenses themselves or between the lenses and the hydraulic actuator. In FIG. 1, a pair of spectacles 100 is shown comprising a frame 101 housing two lenses 102 and 103. The two lenses 102 and 103 are mirror images. A cross-section through lens 103 is shown in FIGS. 2 and 3. A cross-section through lens 102 is not shown as it is simply a mirror image of lens 103 so its structure can easily be gleaned from FIGS. 2 and 3 with no further explanation required. Lens 103 comprises a dish-shaped member 104 and a flexible membrane 105 opposed to the rear surface of dish-shaped member 104. The rear surface of dish-shaped member 104 may be planar (as shown) or it may have one or more curved surfaces to provide optical power. The flexible membrane 105 is held between a pair of supporting rings 106, 107, and supporting ring 107 is coupled to the dish-shaped member 104 by way of its collapsible, resilient side wall 108.

The dish-shaped member 104 together with the flexible membrane 105 defines a cavity 109. The cavity 109 is filled with a liquid having a high refractive index such as a silicone oil. The dish-shaped member 104 and flexible membranes 105 are also made from transparent materials. For example, they may be made from high molecular weight silicone material. Alternatively, the dish-shaped member 104 may be made by co-moulding the side wall 108 from a high molecular weight silicone elastomer with a polycarbonate substrate for the rear surface.

Lens 103 is shown in FIG. 2 in an unactuated state, in which it provides zero or little optical power because the membrane 105 is effectively planar. On the other hand, lens 103 is shown in FIG. 3 in an actuated state, in which the membrane 105 is distended to adopt a curved profile. With this profile, it provides a degree of optical power depending on the radius of curvature. The lens 103 is caused to transfer from the unactuated state to the actuated state by application of a force to the supporting ring 106 at one side of lens 103 as shown by the arrow F. This causes the side wall 108 to collapse underneath the region where the force F is applied, thereby reducing the volume of cavity 109. The side wall does not collapse on the side opposite to the region where force F is applied because this side is held firm and allowed to act as a hinge, as indicated by the hinge point H in FIG. 3. Due to the reduced volume in cavity 109, the liquid pressure causes the flexible membrane 105 to distend as shown in FIG. 3. The force F is applied by a mechanical actuator as explained below. By careful selection of the point of application of force F and the location of hinge points H along with suitably designed supporting rings 106 and 107, it is possible to cause the membrane 105 to distend with a spherical profile despite the fact that the lens has a roughly rectangular shape. The way in which this is achieved is beyond the scope of the present application, but is described in our co-pending application PCT/GB2012/051426.

A hydraulic actuator 110 (shown schematically in the figures) is used to control the degree of force F applied by the mechanical actuator. The hydraulic actuator 110 has a chamber 111 open at one end at which it is coupled to tubes 112 and 113 and sealed by a piston 114 at the other end. The piston 114 is free to move along the body of the hydraulic actuator 110, thereby altering the volume of chamber 111 and hence the volume of liquid that it can contain. A control, for example a thumbwheel or slider, is provided to adjust the position of the piston 114 along the body of the hydraulic actuator 110.

The tubes 112 and 113 pass through the frame 101 and are coupled to respective mechanical actuators 115 and 116. Each mechanical actuator 115 and 116 comprises a piston, which moves in response to changes in hydraulic pressure caused by movement of piston 114. The pistons in actuators 115 and 116 are coupled to respective mechanical linkages, which apply the force F to the supporting ring 106 and the equivalent supporting ring in lens 102. Thus, movement of piston 114 modulates the force applied to the supporting rings in the lenses 102 and 103 and the degree of distension of the flexible membranes. The piston 114 may assume any position between the two ends of the chamber 111 shown in FIG. 1. Thus, the curvature of the flexible membranes in lenses 102 and 103 may be adjusted to any radius between the two extremes shown for membrane 105 in FIGS. 2 and 3.

Figure 4:
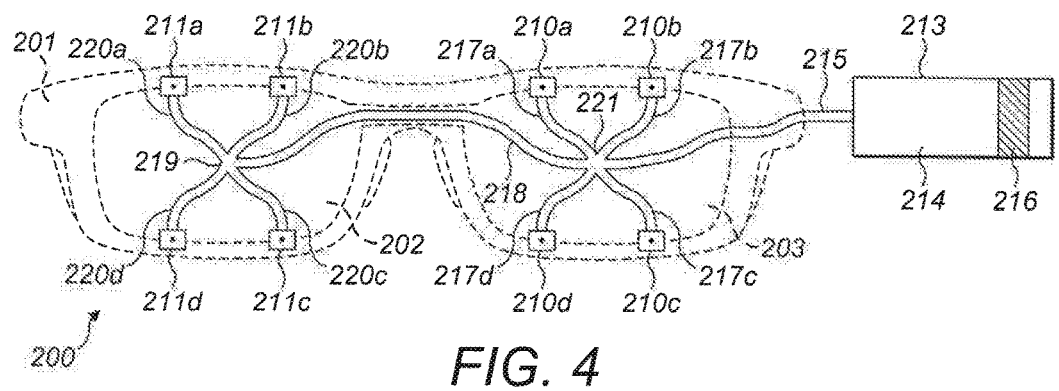
FIG. 4 shows a second embodiment of the invention in which each of two lenses is driven hydraulically at multiple actuation points.
Figure 5:
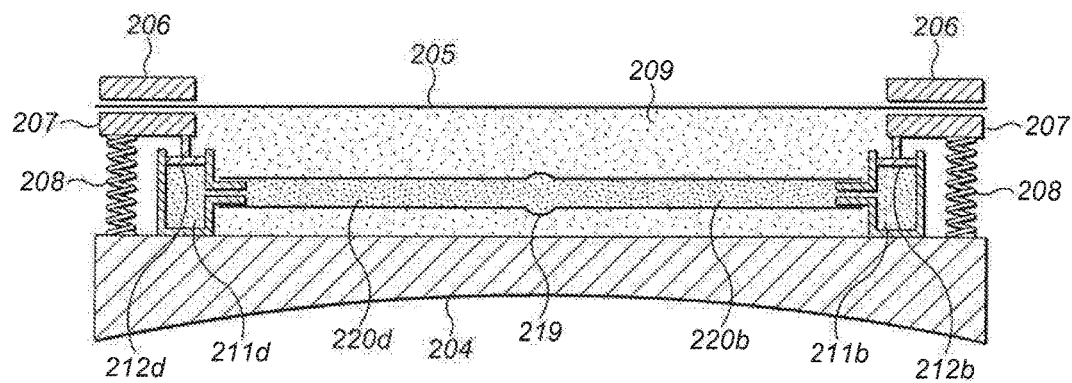
FIG. 5 shows a cross-section through one of the lenses of FIG. 4 when the hydraulic actuator is in a first position.
Figure 6:
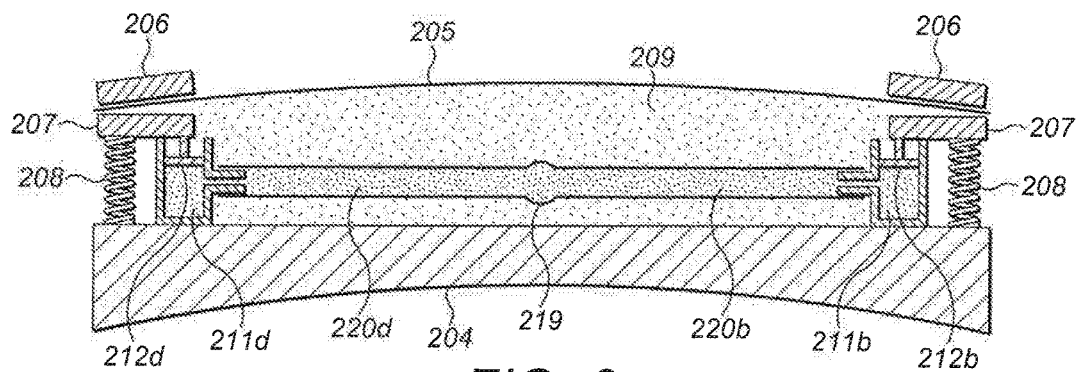
FIG. 6 shows a cross-section through one of the lenses of FIG. 4 when the hydraulic actuator is in a second position.

FIGS. 4 to 6 relate to a second embodiment. This makes use of a refinement of the actuation mechanism of the first embodiment described above with reference to FIGS. 1 to 3. In FIG. 4, a pair of spectacles 200 is shown comprising a frame 201 housing two lenses 202 and 203. The two lenses 202 and 203 are mirror images. A diagonal cross-section through lens 202 is shown schematically in FIGS. 5 and 6. A cross-section through lens 203 is not shown as it is simply a mirror image of lens 202 so its structure can easily be gleaned from FIGS. 5 and 6 with no further explanation required. Lens 202 comprises a rear optical element 204 and a flexible membrane 205 opposed to the rear optical element 204. The rear optical element 204 may be planar or it may be a curved rear surface as shown to provide optical power. The flexible membrane 205 is held between a pair of supporting rings 206, 207, and supporting ring 207 is supported on the rear optical element 204 by way of a collapsible, resilient member 208 extending from the rear optical element 204. In practice, this collapsible, resilient member 208 will be a side wall (similar to the side wall 104 described above with reference to FIGS. 1 to 3) sealing the membrane 205 and the rear optical element 204.

The side wall may be made from a high molecular weight silicone elastomer co-moulded with the rear optical element 204, made for example from polycarbonate. Thus, the rear optical element 204 and flexible membrane 205 are made from transparent, high refractive index materials. The rear optical element 204 together with the flexible membrane 205 defines a cavity 209. The cavity 209 is filled with a liquid having a high refractive index such as a silicone oil.

Lens 202 is shown in FIG. 5 in an unactuated state, in which it provides zero or little optical power because the membrane 205 is effectively planar. On the other hand, lens 202 is shown in FIG. 6 in an actuated state, in which the membrane 205 is distended to adopt a curved profile. With this profile, it provides a degree of optical power depending on the radius of curvature. The manner in which lens 202 shown in FIGS. 5 and 6 transfers between the actuated and unactuated states is similar to that of lens 103 shown in FIGS. 2 and 3. In this case, a force is applied to supporting ring 207 (although a force could instead be applied to supporting ring 206 as with lens 103) to pull it towards the rear optical element 204 against the restoring force exerted by resilient member 208. In this case the force may be applied by each of a plurality of actuators 210a-d. Corresponding actuators 211a-d are provided for lens 202. This causes the resilient member 208 to collapse with maximal collapse around the actuators 210a-d, thereby reducing the volume of cavity 209. Due to the reduced volume in cavity 209, the liquid pressure causes the flexible membrane 205 to distend as shown in FIG. 3. The amount of collapse elsewhere around the supporting rings 206 and 207 depends on their design, which can be tailored according to the principles discussed in PCT/GB2012/051426 to ensure that the membrane 205 distends with a spherical profile despite its approximately rectangular shape. No hinge points are provided to hold the resilient member 208 firm in various regions as is done with the side wall 108 described above; instead, active control of the deflection of the supporting rings 206, 207 is provided at multiple, strategically chosen points around their periphery. This results in a more easily-controlled and improved shape for the distended membrane 205. The actuators 210a-210d may apply the same force or each may be configured to apply a different respective force. This is achieved by providing pistons (two of which are shown as 212b and 212d in FIGS. 5 and 6) within the actuators with appropriate surface areas so that a desired force is applied for a given hydraulic pressure within the actuators.

A hydraulic actuator 213 (shown schematically in the figures) is used to control the hydraulic pressure that bears on the pistons in actuators 210a-d and 211a-d. The hydraulic actuator 213 has a chamber 214 open at one end at which it is coupled to tube 215 and sealed by a piston 216 at the other end. The piston 216 is free to move along the body of the hydraulic actuator 213, thereby altering the volume of chamber 214 and hence the volume of liquid that it can contain. A control, for example a thumbwheel or slider, is provided to adjust the position of the piston 216 along the body of the hydraulic actuator 213.

The tube 215 passes through the frame 201 and into the cavity of lens 203, where it divides at junction 221 into tubes 217a-d, which are coupled to respective ones of actuators 210a-d, and into tube 218. Tube 218 leads out of the cavity of lens 203 through the bridge of frame 201 into the cavity 209 of lens 202 to junction 219. At junction 219, tube 218 is coupled to tubes 220a-d, which are coupled to respective ones of actuators 211a-d. Thus, any change in hydraulic pressure caused by movement of piston 216 in hydraulic actuator 213 will cause a corresponding change in force exerted by each of the pistons in actuators 210a-d and 211a-d, which couple the force onto the supporting rings holding each membrane. Thus, movement of piston 216 modulates the force applied to the supporting rings in the lenses 202 and 203 and the degree of distension of the flexible membranes. The piston 216 may assume any position between the two ends of the chamber 214 shown in FIG. 4. Thus, the curvature of the flexible membranes in lenses 202 and 203 may be adjusted to any radius between the two extremes shown for membrane 205 in FIGS. 5 and 6. The tubing used to make tubes 215, 217a-d, 218 and 220a-d is made from a material that has a refractive index that matches that of the silicone oil used to fill the cavities of the lenses 202 and 203. A suitable material for the tubing is Lexan 8010, which has a refractive index around 1.5858 (at 20° C.

and 589.3 nm); the DC-705 silicone oil sold by Dow Corning Corporation of Midland, Mich., USA has a refractive index (1.5805 also at 20° C. and 589.3 nm) very closely matched to this, enabling tubing made from Lexan 8010 effectively to disappear when immersed in it. The hydraulic fluid used within the hydraulic system of hydraulic actuator 213, tubes 215, 217a-d, 218 and 220a-d, and actuators 210a-d and 211a-d is the same silicone oil as that used to fill the cavities of the lenses 202 and 203 and therefore has the same refractive index. Since the tubing has the same refractive index as the liquid surrounding it and within it, it is rendered invisible within the lenses 202 and 203. However, since it can be routed through the interior of the lenses 202 and 203, it takes up no external space around the lenses 202 and 203, which can therefore be housed in more discrete, potentially rimless, frames.

Figure 7:
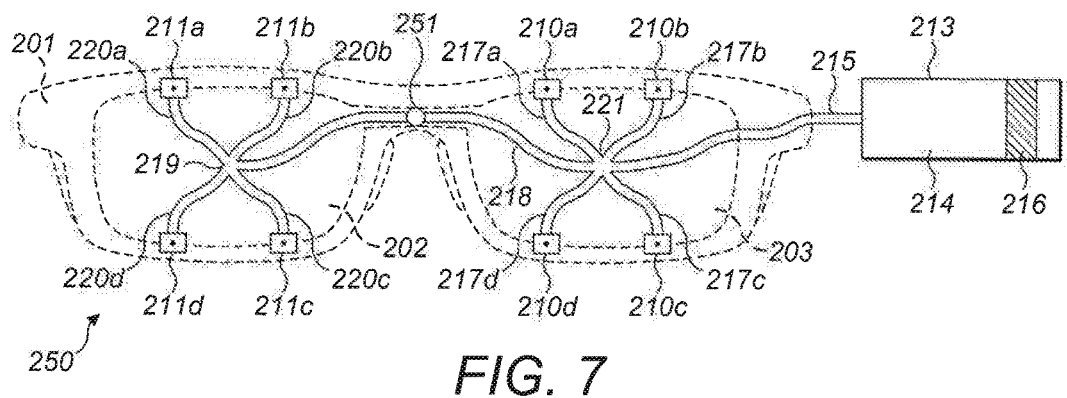
FIG. 7 shows a variant of the second embodiment, having an isolator valve or restrictor between the two lenses.

In FIG. 7, a variant of the second embodiment is shown. In this variant, a pair of spectacles 250 comprises all of the features of the spectacles 200 according to the second embodiment described above with reference to FIGS. 4 to 6. However, it additionally comprises a flow restrictor valve 251 in the tube 218 between junctions 221 and 219. This can be adjusted to cause the actuators 211a-d to move at a different (slower) rate than the actuators 210a-d for a given adjustment of the piston 216 in hydraulic actuator 213. In the extreme, the flow restrictor valve 251 can restrict the flow of liquid along tube 218 entirely so that actuators 211a-d do not react at all to adjustment of piston 216.

This enables the use of the monovision technique referred to above. To use this, the piston 216 is used to adjust the actuators 211a-d so that the corresponding membrane adjusts to the distension required for the desired optical power for the right eye. The flow restrictor valve 251 is then closed to seal tube 218 and the piston 216 used to adjust the actuators 210a-d so that the corresponding membrane adopts the distension required for the desired optical power for the left eye. The optical power of the membrane for the left eye may be adjusted freely without affecting the optical power of the membrane for the right eye.

Figure 8:
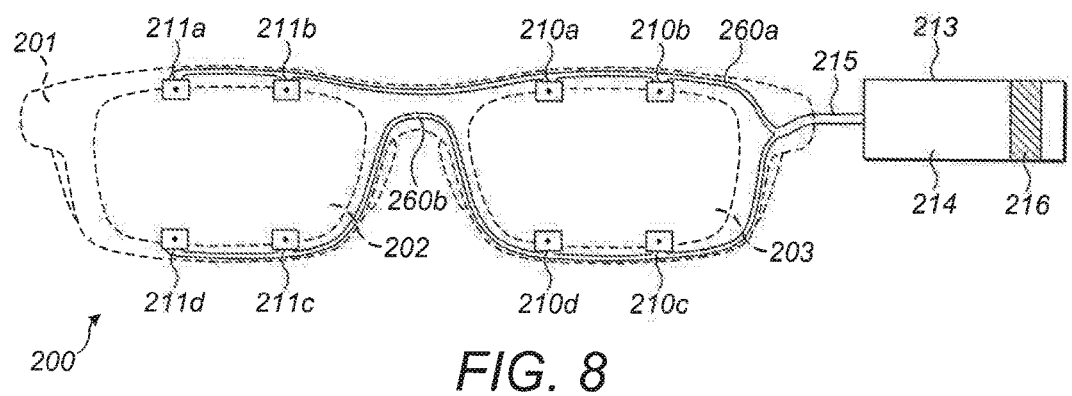
FIG. 8 shows a variant of the second embodiment in which the actuators are disposed outside the lens cavities.
Figure 9:
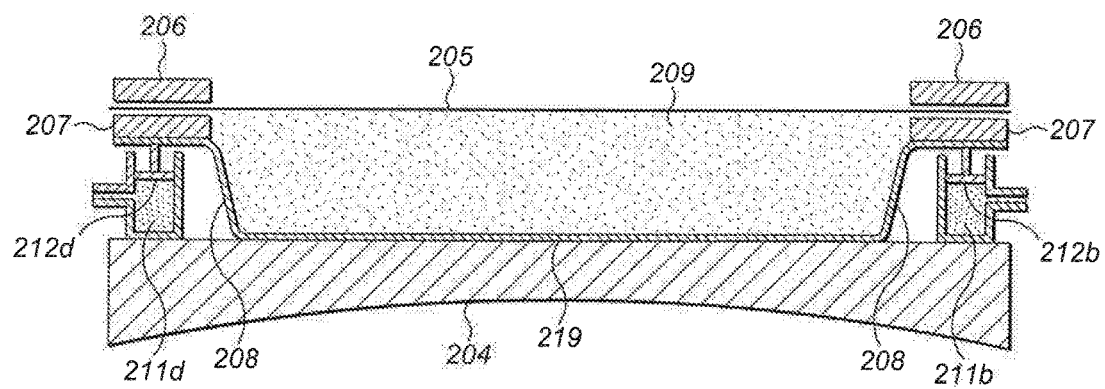
FIG. 9 shows a cross-section through one of the lenses of FIG. 8.

FIGS. 8 and 9 shows a variant of the embodiment of FIGS. 4 to 6, in which the actuators 210a-d and 211a-d are disposed outside the lens cavities. Parts that are identical to those of FIGS. 4 to 6 are identified by the same reference numbers.

As can be seen from FIG. 9, the side wall 208 is of the same kind used in the embodiment of FIGS. 1 to 3. The rear optical element 204 and side wall 208 together form a dish-shaped member, which may be made by co-moulding the side wall 208 from a high molecular weight silicone elastomer with a polycarbonate substrate for the rear optical element 204.

The actuators 210a-210d and 211a-211d (of which only 212b and 212d are visible in FIG. 9) are arranged so that they can apply force to selected points of the supporting ring 207. The actuators 210a-210d and 211a-211d may bear on supporting ring 207 through side wall 208 or a relief aperture may be formed in side wall 208 so that the actuators 210a-210d and 211a-211d can bear directly on the supporting ring 207. As has been explained previously, the supporting ring 207 is designed so that its bending stiffness varies around its circumference such that when an actuation force is applied to selected points, the ring 207 deforms in such a way that the membrane 205 attached to it will adopt a desired profile, which is typically a spherical profile.

By virtue of the arrangement shown in FIG. 9, the actuators 210a-210d and 211a-211d can be disposed outside the cavities of the lenses 202 and 203. This simplifies the sealing of the lenses 202 and 203 and simplifies assembly of the lenses 202 and 203 because the lenses 202 and 203 can be provided as finished modules to the production line for fitment of the other parts including the actuators 210a-210d and 211a-211d. The actuators 210a-210d and 211a-211d may be hydraulically coupled to the hydraulic actuator 213 in a variety of ways, such as that shown in FIG. 8. In this, the tube 215 bifurcates into tube 260a, which is coupled to each of actuators 210a, 210b, 211a and 211b, and tube 260b, which is coupled to each of actuators 210c, 210d, 211c and 211d. The tubes 260a and 260b may be run through channels provided in the frame 201.

Figure 10:
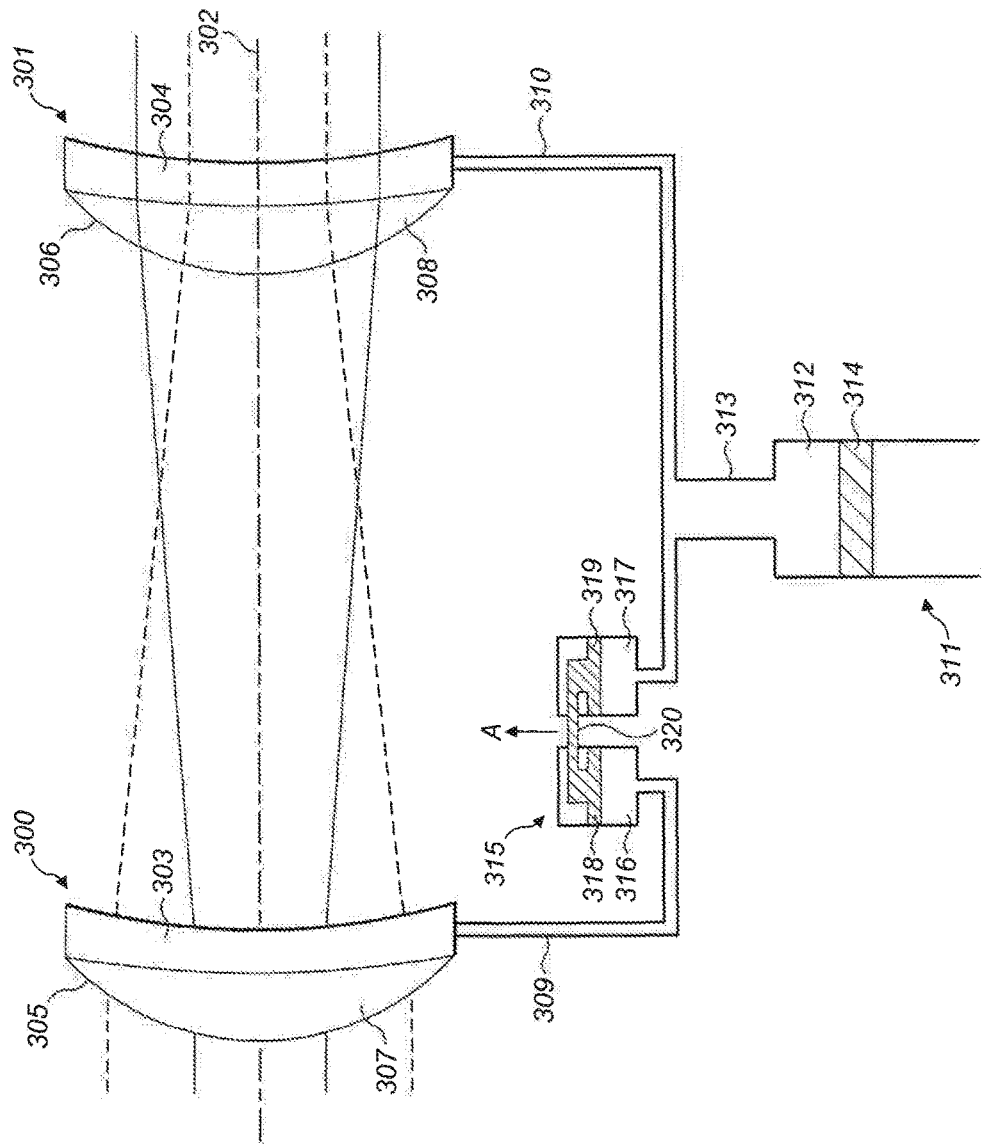
FIG. 10 shows a zoom lens according to the invention.

FIG. 10 shows a different application of the invention, specifically to a zoom lens. The zoom lens comprises two lenses, a focus lens 300 and a variator lens 301 in optical alignment with each other on an optical axis 302. In a practical embodiment, these two lenses 300 and 301 are likely to form part of respective groups of optical elements, known as the focus group and variator group. The focus lens 300 and variator lens 301 are the active elements within these groups and are responsible for controlling the focal length of their respective group to control the overall focal length provided by the zoom lens.

In a conventional zoom lens, the focus and variator groups move along the optical axis of the zoom lens as the zoom lens is adjusted. The variator group controls the overall magnification of the focus group, which focuses an image on the focal plane. However, with this arrangement the variator and focus group need not move along the optical axis since the variation in focal length can be controlled by adjusting the fluid pressure in the lenses 300 and 301.

Each of the focus and variator lenses 300 and 301 is similar in construction to the liquid lenses described with reference to the other embodiments. They are only shown schematically in FIG. 10, but the salient features of each lens are visible. Specifically, each lens has a rear optical element 303 and 304 and a flexible, distensible membrane 305 and 306. The rear optical elements 303 and 304 may be planar, but in this case have curved front and rear surfaces to provide a degree of optical power even when the membranes 305 and 306 are not distended.

The membrane 305 and rear optical element 303 define a cavity 307 in focus lens 300, which is filled with liquid. Similarly, the membrane 306 and rear optical element 304 define a cavity 308 in variator lens 301, which is also filled with liquid. The liquid pressure in each cavity 307 and 308 controls the degree of distension of the membranes 305 and 306 and hence, the optical power provided by lenses 300 and 301.

The two cavities 307 and 308 are in fluid communication with an actuation system by way of respective hydraulic tubes 309 and 310. The hydraulic actuation system comprises a hydraulic actuator 311. The hydraulic actuator 311 has a chamber 312 open at one end at which it is coupled to tube 313 and sealed by a piston 314 at the other end. The piston 314 is free to move along the body of the hydraulic actuator 311, thereby altering the volume of chamber 312 and hence the volume of liquid that it can contain. A control, for example a thumbwheel or slider, is provided to adjust the position of the piston 314 along the body of the hydraulic actuator 311.

Although tube 310 is shown directly coupled to tube 313, other embodiments provide hydraulic gearing in tube 310. This can be achieved by having a pair of pistons linked together so that both move together such that an increase in fluid pressure against one piston increases the fluid pressure exerted by the other piston. By selecting the areas of the pistons appropriately (i.e. so that the area of the piston closest to the lens 301 is smaller than that of the piston closest to the hydraulic actuator 311), the pressure in the cavity 308 can be caused to be greater than that in the hydraulic actuator 311.

The tube 313 is coupled directly to the cavity 308 of lens 301 and to a hydraulic inverter 315. This causes the pressure in tube 309, and hence cavity 307 of lens 300, to vary in inverse proportion to that in the chamber 312 in hydraulic actuator 311. Thus, as the pressure in chamber 312 increases, the pressure in cavity 307 decreases. Thus, the hydraulic pressures in cavities 307 and 308 vary in opposite directions to each other as the piston 314 in hydraulic actuator 311 is moved. The optical powers provided by each of lenses 300 and 301 therefore vary in opposite directions. The hydraulic inverter 315 comprises two actuators 316 and 317 coupled together by their pistons 318 and 319 with a link 320.

As the fluid pressure in chamber 312 increases, piston 319 is pushed in the direction of arrow A. Due to the coupling by link 320, piston 318 is also forced to move in the same direction, reducing the fluid pressure in cavity 307 and allowing the membrane 305 to relax. At the same time, the fluid pressure in tube 310 and cavity 308 increases due to the increase in fluid pressure in chamber 312, and the membrane 306 distends further.

Conversely, as the fluid pressure in chamber 312 decreases, piston 319 moves in the opposite direction to arrow A. Due to the coupling by link 320, piston 318 is also forced to move in the same direction, increasing the fluid pressure in cavity 307 and forcing the membrane 305 to distend. At the same time, the fluid pressure in tube 310 and cavity 308 decreases due to the decrease in fluid pressure in chamber 312, and the membrane 306 is caused to relax.

The degree of variation of the fluid pressures in cavities 307 and 308 may be the same for a given variation in the fluid pressure in hydraulic actuator 311. However, it is generally more likely that the system will be configured to provide different degrees of variation of the fluid in cavities 307 and 308 for a given variation in the fluid pressure in hydraulic actuator 311. This will normally be required since it is unlikely that the optical powers of lenses 300 and 301 will need to be varied at the same rate.

The zoom lens of FIG. 10 provides a very straightforward way of adjusting the overall focal length and maintaining focus by varying the focal lengths of two liquid lenses in optical alignment at the same time. The hydraulic tubing and actuators may be made very compactly with respect to conventional, complicated cam driven actuation systems.

The invention claimed is:

1. A pair of spectacles comprising first and second variable focal length lenses forming left and right lenses of the pair of spectacles, each variable focal length lens comprising a distensible membrane bounding a fixed-volume fluid-filled cavity and control ring attached to the periphery of the membrane;
    an actuation mechanism for simultaneous action of the first and second variable focal length lenses, the actuation mechanism being configured to adjust the focal length of each lens by applying a force to its respective control ring;
    the actuation mechanism comprising a hydraulic master actuator, hydraulically-controlled mechanical slave actuator associated with the first lens and a hydraulically-controlled mechanical slave actuator associated with the second lens, each hydraulically-controlled mechanical slave actuator being configured to exert a mechanical force on the control ring of its associated lens for varying the degree of distension of the membrane of its associated lens in response to operation of the master actuator, and tubes containing hydraulic fluid, the hydraulically-controlled mechanical slave actuators being hydraulically coupled to the master actuator by the hydraulic fluid in the tubes for driving the hydraulically-controlled mechanical slave actuators by hydraulic transmission of an actuation force from the master actuator to the hydraulically-controlled mechanical slave actuators, whereby the master actuator is operable to cause a variation of the degree of distension of the membranes of both the first and second lenses simultaneously.

2. The pair of spectacles according to claim 1, wherein each hydraulically-controlled mechanical slave actuator is adapted to exert a respective desired farce for a given fluid pressure.

3. The pair of spectacles according to claim 1, wherein the tubes are transparent and are matched in refractive index to the fluid filling the cavities of the first and second lenses.

4. The pair or spectacles according to claim 1, wherein each hydraulically-controlled mechanical slave actuator is disposed outside the fluid-filled cavity of its associated lens.

5. A pair of spectacles comprising:
    first and second variable focal length lenses forming left and right lenses of the spectacles, each variable focal length lens comprising:
        a distensible membrane bounding a fixed-volume fluid-filled cavity;
        a control ring attached to the periphery of the membrane; and
    an actuation mechanism for simultaneous actuation or the first and second variable focal length lens, the actuation mechanism being configured to adjust the focal length of each lens by applying a force to its respective control ring, the actuation mechanism comprising:
        a hydraulic master actuator;
        a first plurality of hydraulically-controlled mechanical slave actuators that are arranged to exert a mechanical force on the control ring of the first variable focal length lens for varying the degree of distension of the membrane of the first variable focal length lens in response to operation of the master actuator;
        a second plurality of hydraulically-controlled mechanical shave actuators that are arranged to exert a mechanical force on the control ring of the second variable focal length lens for varying the degree of distension of the membrane of the second variable focal length lens in response to operation of the master actuator; and tubes containing hydraulic fluid;
        the hydraulically-controlled mechanical slave actuators of the first and second plurality of hydraulically-controlled mechanical slave actuators being hydraulically coupled to the master actuator by the hydraulic fluid in the tubes for driving the hydraulically-controlled mechanical slave actuators by hydraulic transmission of an actuation force from the master actuator to the hydraulically-controlled mechanical slave actuators, whereby the master actuator is operable to cause a variation of the degree of distension of the membranes of the first and second variable focal length lenses.

6. The pair of spectacles according to claim 5, wherein each of the first plurality of hydraulically-controlled mechanical slave actuators is disposed at a respective control point around the periphery of the first lens.

7. The pair of spectacles according to claim 6, wherein each hydraulically-controlled mechanical slave actuator in the first plurality of hydraulically-controlled mechanical slave actuators is adapted to exert a respective desired force on the control ring for a given fluid pressure.

8. The pair of spectacles according to claim 5, wherein the transparent and are matched in refractive index to the fluid filling the cavity of the first lens.

9. The pair of spectacles according to claim 5, wherein each of the first plurality of hydraulically-controlled mechanical slave actuators is disposed outside the fluid-filled cavity of the first variable focal length lens.

10. The pair of spectacles according to claim 5, wherein each of the second plurality of hydraulically-controlled mechanical slave actuators is disposed at a respective control point around the periphery of the second variable focal length lens.

11. The pair of spectacles according to claim 10, wherein each hydraulically-controlled mechanical slave actuator in the second plurality of hydraulically-controlled mechanical slave actuators is adapted to exert a respective desired force on the control ring for a given fluid pressure.

12. The pair of spectacles according to claim 5, wherein each of the second plurality of hydraulically-controlled mechanical slave actuators is disposed outside the fluid-filled cavity of the second variable focal length lens.

13. A pair of spectacles comprising:
a frame;
first and second variable focal length lenses; and
an actuation mechanism for simultaneous actuation of first and second variable focal length lenses; the first and second variable focal length lenses each comprising a distensible membrane bounding a fixed-volume fluid-filed cavity and a control ring attached to the periphery of the membrane; the actuation mechanism configured to adjust the focal length of each lens by applying a force to its respective control ring, the actuation mechanism comprising a hydraulic master actuator, a hydraulically-controlled mechanical slave actuator associated with the first lens and a hydraulically-controlled mechanical slave actuator associated with the second lens, each hydraulically-controlled mechanical slave actuator being configured to exert a force on the control ring of its associated lens for varying the degree of distension of the membrane of its associated lens in response to operation of the master actuator, and tubes containing hydraulic fluid; the hydraulically-controlled mechanical slave actuators being hydraulically coupled to the master actuator by the hydraulic fluid in the tubes for driving the hydraulically-controlled mechanical slave actuators by hydraulic transmission of an actuation force from the master actuator to the hydraulically-controlled mechanical slave actuators; whereby the master actuator is operable to cause a variation of the degree of distension of the membranes of both the first and second lenses simultaneously,
and wherein the first and second lenses are housed in the frame to form left and right lenses of the pair of spectacles.

14. The pair of spectacles according to claim 13, wherein the degree of distension of the membrane in the first variable focal length lens is different from that in the second variable focal length lens for a given operation of the master actuator.

* * * * *